Sept. 5, 1933.    T. A. KILLMAN    1,925,638
EGG BEATER
Original Filed Jan. 6, 1931
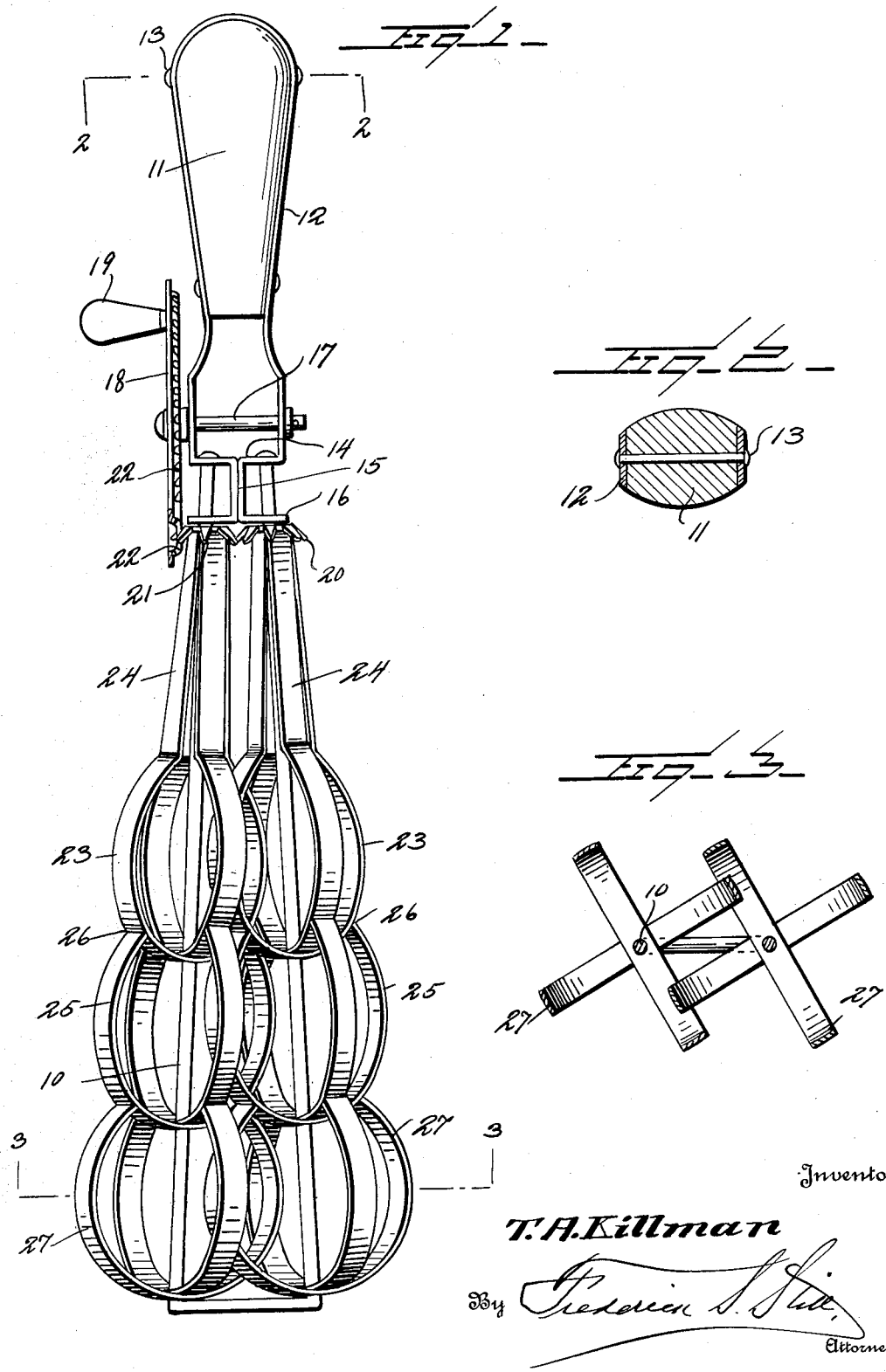

Patented Sept. 5, 1933

1,925,638

UNITED STATES PATENT OFFICE 1,925,638

EGG BEATER

Thomas A. Killman, Nashville, Tenn., assignor to Robert H. Waller, Nashville, Tenn.

Application January 6, 1931, Serial No. 506,943
Renewed February 13, 1933

1 Claim. (Cl. 259—131)

This invention relates to beaters of the rotary type such as are used for beating eggs, milk and other like materials and relates particularly to the beater element or elements thereof. One type of egg beater on the market and in very general use consists of an assemblage of annular blades which are caused to revolve at or near the bottom of a bowl or the like by means of a crank and gear wheels or other suitable driving means. I have found by actual experiment, particularly with egg beaters of the last named type that there is a great difference between merely stirring eggs and "beating" them, that is, eggs or other liquids may be simply stirred for any length of time without actually beating them, as the beating of either eggs, cream, milk or the like consists in incorporating air into the liquid in the form of small bubbles which are whipped into it by the beater, said bubbles causing the liquid to increase in bulk and become light and frothy which is the real object sought to be accomplished in the beating of liquids such as eggs, cream, etc.

I have found by experiment and study that such rotary egg beaters as above described, beat very well for a while, that is, until the liquid builds up sufficiently to overflow or cover the cluster of beater blades. Then the instrument practically ceases beating the liquid and does nothing but stir the liquid around and around no matter how long the operation may be continued. This I have found is caused by the fact that when the ring-like beater blades are submerged in the liquid, they cannot come in contact with any more outside air in order to whip it into the liquid, with the result that the beating process stops, while any further operation of the beater will do nothing but stir without any beneficial result. This is evidenced by the fact that if a sufficient quantity of eggs or other liquid be put into the bowl at the start to cover the beater rings constituting the beater element, it will scarcely beat at all.

The general object of my invention, therefore, is to avoid the difficulty above stated and to provide a beating element which is so constructed as to secure a maximum effect and more specifically to provide each beater element with a series of superposed beater rings or blades one immediately above the other but with each blade overlapped with an annular blade of a lower set a short distance so that before the lower set becomes submerged and stops its beating, the upper set will take hold and continue the beating process until it becomes covered.

Other objects will appear in the course of the following description.

My invention is illustrated in the accompanying drawing, wherein:—

Figure 1 is an elevation of the egg beater constructed in accordance with my invention;

Figure 2 is a section on the line 2—2 of Figure 1;

Figure 3 is a section on the line 3—3 of Figure 1.

In the drawing, 10 designates an approximately U-shaped frame, the two legs of which constitute axes around which the beater elements operate as usual. These legs converge upward and at their upper ends are attached to a handle in the manner now to be described. The handle is composed of a wooden or composition member 11 around which a strip of metal 12 is extended, the strip of metal being held in place by rivets 13. The two legs of the strip of metal extend downward to any desired amount and then are inwardly extended, as at 14, then extend straight downward in parallel relation to each other, as at 15, and then are outwardly extended, as at 16, these outward extensions being parallel to the portion 14. The portions 15 are welded or otherwise connected to each other. The two legs 10 of the U-shaped frame extend upward through the portions 16 and 15 are flattened where they extend through these portions so that they cannot turn therein and are formed so that they will not shift longitudinally. Extending through the two legs of the strip 12 is the shaft 17, this shaft carrying a sheet metal driving wheel 18 having a crank handle 19. Mounted upon the legs of the frame 10 are the intermeshing sheet metal gear wheels 20 and 21, the gear wheel 20 being engaged by the driving gear wheel 18 which is perforated at 22, for the reception of the teeth of the wheel 21. Attached to the under faces of the gear wheels 20 and 21 are the two companion beating elements.

As illustrated, each beating element consists of a series of superposed blades. The uppermost set of blades consists of two annular blades 23 disposed at right angles to each other and having shanks 24 extending upward and engaged with the gear wheels 21 or 22, respectively. Through the intersection of these blades, one leg of the frame passes.

Disposed below the blades 23 is a second set of blades 25 also disposed at right angles to each other, these blades being curved to form what might be termed a frustrated annulus, that is, each blade is an incomplete annulus butted at 26 against the corresponding blade above and welded, soldered or otherwise engaged therewith.

The lowermost set of blades is designated 27 and here again these blades are disposed at right angles to each other and each blade is a frustrated annulus having its ends butting against the corresponding blades of the series of blades 25 just above. I have illustrated three sets of blades 23, 25 and 27 to constitute the beating element. I do not wish to be limited to this as I may use more than three sets of blades to form each beating element or less than three. I have used three, however, in order to provide an instrument which is capable of beating a relatively large quantity of liquid at a time. For use with a less quantity of liquid, a beating element having only two sets of blades will be sufficient, the object being to provide that the blades of the beating element shall never be entirely submerged in the liquid.

It will be seen that with this construction I have provided for each beating element a series of blades or clusters of blades, that an upper cluster of blades extends down into or toward the center of a lower cluster of blades and in one sense overlaps this lower cluster of blades a short distance so that before the lower set of blades can possibly be submerged and thus stop its beating action, the upper set will take hold and continue the beating process until it in turn becomes covered. I have found that three superposed sets of blades is entirely sufficient for all practical purposes, though as before stated I do not wish to be limited to this.

It will be seen that the handle construction is extremely simple and yet strong and effective structure which may be formed of a single strip of relatively narrow sheet metal and thus cheapen the construction of the beater.

While I prefer that the blades shall be annular or nearly annular, I do not wish to be limited to the exact shape of the blades except as specified in the accompanying claim.

I claim:—

An egg beater having a handle, two approximately parallel shafts extending downward from the handle, two beating elements one mounted for rotation on each shaft, each beating element comprising a plurality of sets of blades disposed one above another, the blades of one set being disposed in the same plane as the like blades of the next adjacent set, and the blades of an upper set intersecting the upper ends of the blades of the next adjacent set below and extending reentrantly into the space defined by the blades below, the beating elements being so disposed with relation to each other that the blades of one element operate within the spaces between the blades of the other element, and means on said handle whereby both sets of blades may be rotated simultaneously.

THOMAS A. KILLMAN.